May 25, 1954  R. N. PRITTIE  2,679,170
TORQUE LIMITING DEVICE
Filed April 16, 1952

INVENTOR.
ROBERT N. PRITTIE
BY
*Frank H. Harmon*
ATTORNEY

Patented May 25, 1954

2,679,170

UNITED STATES PATENT OFFICE 2,679,170

TORQUE LIMITING DEVICE

Robert N. Prittie, Chagrin Falls, Ohio, assignor to Jack & Heintz, Inc., Cleveland, Ohio, a corporation of Delaware Application April 16, 1952, Serial No. 282,666

5 Claims. (Cl. 74—785)

This invention relates in general to improvements in torque limiting devices, and more particularly to those employing a multiple friction disc assembly.

The conventional torque limiter for planetary gear trains consists of a pack of discs with steel internal gear discs assembled alternately with externally splined bronze discs. The splined bronze discs mate with an internal spline in the gear housing. With the pack spring-loaded axially, the internal gear discs form the fixed member, under normal operating conditions, of a stage of planetary reduction gearing. When the torque load on the planetary carrying arm increases sufficiently to overcome the friction between the spring-loaded discs, the carrying arm stops and the internal gear discs slip.

Because the coefficient of starting friction is higher than the coefficient of sliding friction, the torque load on the carrying arm required to start the internal gear discs slipping is higher than that required to keep the discs slipping. This ratio of "breakaway" torque to "slipping" torque becomes excessive under certain conditions. This is especially evident at low temperature, under which condition the shearing resistance of the lubricant used in the pack of discs increases appreciably.

In such torque limiting devices, that are used in connection with planetary gear trains, dynamic breakaway torque is the maximum torque exerted on the planetary gear carrying arm as the result of suddenly arresting the rotation of the carrying arm, such as by engagement with a fixed jaw clutch. This causes the internal gear to slip, while the input torque is still being applied to the sun gear of the planetary gearing stage. Dynamic breakaway torque is distinguished from static breakaway torque as the latter is the torque exerted on the planetary carrying arm when locked before input torque is applied to the sun gear, causing the internal gear discs to slip.

One of the primary objects of my invention is to provide an improved torque limiting device that will inherently have a low ratio of dynamic breakaway torque to slipping torque throughout a wide temperature range.

Figure 1:
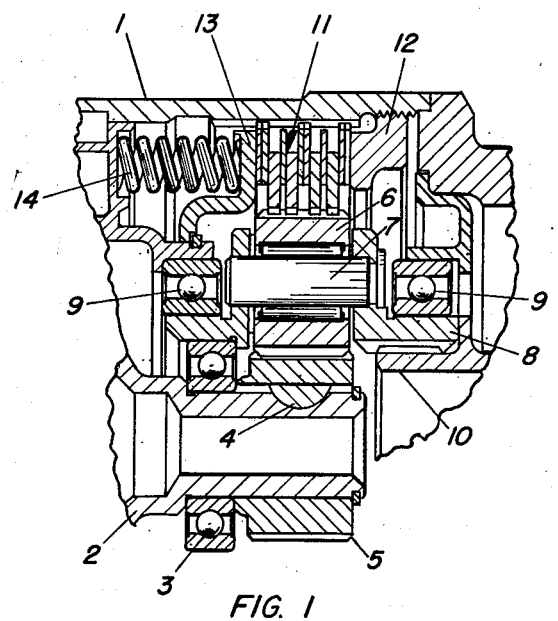
Figure 2:
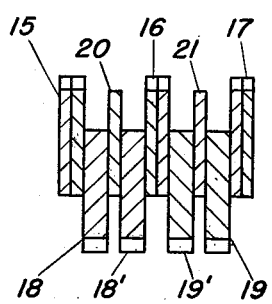

With the foregoing and other objects in view, the invention resides in the combination of parts and in the details of construction hereinafter set forth in the following specification and appended claims, certain embodiments thereof being illustrated in the accompanying drawings, in which:

Figure 1 is a fragmentary view in longitudinal section, showing a driving shaft and a driven shaft with a planetary gear train and multiple friction disc torque limiting device; and Figure 2 is a detail enlarged view of my novel friction disc assembly.

Referring more particularly to the drawings, I have shown my novel torque limiter multiple friction disc assembly as applied to a conventional planetary gear train, as may be found between the motor driving shaft and a driven output shaft.

Inside of housing 1, a driving shaft 2 is mounted for rotation in a ball bearing 3. Shaft 2 has keyed thereto at 4, near one end, a sun gear 5 of a planetary reduction gear train. In Figure 1, one of the usual planetary gears is shown at 6 meshing with sun gear 5 and rotatably supported by a cross pin 7 in a planetary gear carrier 8 that is supported by ball bearings 9. The carrier 8 is internally splined to mate with external splines on an output shaft 10 to drive the latter.

A multiple friction disc brake assembly is generally indicated at 11 in Figure 1. It consists generally of a series of centrally apertured discs encircling the planetary gear assembly and is disposed between a stationary frame member 12 and a linearly slidable plate 13 that is urged to the right by compression springs 14 to compress the friction disc assembly 11.

This friction disc assembly is shown in greater detail in Figure 2. For purposes of illustration, there are shown three pairs of bronze discs indicated at 15, 16 and 17, all of which are provided with circumferential teeth to mate with internal splines on the housing 1 to permit linear movement but prevent rotative movement of these bronze discs. Between these pairs of bronze discs are arranged two pairs of steel discs 18 and 18′ and 19 and 19′ that are provided with a series of teeth to mesh with the external teeth of the planetary gears 6. In between the pair 18 and 18′ is arranged an untoothed bronze disc 20 and in between the pair 19 and in between the pair 19 and 19′ is arranged an untoothed bronze spacer disc 21.

It has long since been conceded that the use of lubricant between the opposed faces of the discs, as well as means for preventing its escape, is imperative for the proper operation of such a torque limiter. However, lubricants that can stand high temperatures are inclined to materially increase in viscosity at low temperatures. This results in the above mentioned high breakaway torque when the torque limiting device is required to slip.

This is the reason for my departure, as shown in Figure 2, from the conventional. The bronze external gear discs, arranged in pairs 15, 16 and 17 are conventional and have a standard number of circumferential teeth.

As to the steel internal gear discs, I provide one of each pair with less internal gear teeth than the other. As an example, I will refer to outer gear discs 18 and 19 as having a standard number of 87 internal gear teeth and special inner gear discs 18' and 19' as having 90 internal gear teeth. The bronze spacers 20 and 21 are added to separate the standard disc 18 from special disc 18' and standard disc 19 from special disc 19'.

In operation, as soon as the motor shaft 2 begins to rotate, there will be relative rotation between each standard internal gear disc 18 and 19 and its adjacent special internal gear disc 18' and 19', respectively. Thus, the standard and special internal gears, in bearing on the opposite faces of their common intermediate bronze spacer, are forced to rotate with respect to each other, although at a low rate as compared with the speed of the output shaft 10. This rotation against the frictional resistance produced by the springs 14 generates heat so as to reduce the viscosity of the lubricant grease in the assembly. The grease is also sheared, which, together with the lowered viscosity tends to reduce the dynamic breakaway torque of the unit.

All of this occurs rapidly, inasmuch as the standard and special internal gears rotate relatively to each other at low torques, even while the friction disc assembly, as a unit, remains stationary to function as a means for driving the output shaft.

"Slippage, or relative rotation, between the discs of the torque limiting device causes heat to be generated, which first reduces the viscosity of the lubricant and then causes the lubricant to be sheared off at the disc faces. At the instant that excessive torque is imposed upon the torque limiting device, the dynamic breakaway torque will be considerably less than that of a conventional torque limiting device with the same slip setting. This is because the lubricant will have been sheared during any operation prior to the instant that excessive torque occurs.

In my illustrative example with respect to standard and special internal gear discs, I have in mind the use of the planetary gears. I have named 87 teeth as standard and 90 as special. This is merely an arbitrary example and could be 87 and 84 or any other number with increments of 3 tooth difference. Thus, if two planets are used, the tooth differential should be in increments of 2.

It is also to be understood that, whereas I have described my invention in connection with a torque limiter using lubricant, it also has utility in a dry torque limiter.

I claim:

1. In combination with a planetary gear train mounted in a housing and arranged between a driving input shaft and a driven output shaft, said gear train having an externally toothed pinion, a multiple friction disc torque limiting device having alternately arranged pairs of stationary and rotatable discs normally spring pressed into frictional engagement, said stationary discs being peripherally toothed to engage teeth on the inner surface of said housing and said rotatable discs having internal teeth to mate with the external teeth of said pinion, one disc of each pair of rotatable discs having a greater number of internal teeth than the other so as to be rotated relatively to each other by said planetary gears, so as to generate frictional heat and reduce the viscosity of lubricant and shear the same in the device adjacent said multiple disc assembly.

2. In combination with a planetary gear train mounted in a housing and arranged between a driving input shaft and a driven output shaft, said gear train having an externally toothed pinion, a multiple friction disc torque limiting device having alternately arranged pairs of stationary rotatable discs normally spring pressed into frictional engagement, said stationary discs being peripherally toothed to engage teeth on the inner surface of said housing and said discs having internal teeth to mate with the external teeth of said pinion, a spacer disc arranged between each pair of rotatable discs, one disc of each pair of rotatable discs having a greater number of internal teeth than the other so as to be rotated relatively to each other by said planetary gears so as to generate frictional heat and reduce the viscosity of lubricant and shear the same in the device adjacent said multiple disc assembly.

3. In combination with a planetary gear train mounted in a housing arranged between a driving input shaft and a driven output shaft, said gear train having an externally toothed pinion, a multiple friction disc torque limiting device having alternately arranged pairs of relatively soft stationary relatively hard rotatable discs, normally spring pressed into frictional engagement, said soft discs being peripherally toothed to engage teeth on the inner surface of said housing and said hard discs having internal teeth to mate with the external teeth of said pinion, one disc of each pair of hard discs having a greater number of internal teeth than the other, so as to be rotated relatively to each other by said planetary gears so as to generate frictional heat and reduce the viscosity of lubricant and shear the same in the device adjacent said multiple disc assembly.

4. In combination with a planetary gear train mounted in a housing and arranged between a driving input shaft and a driven output shaft, said gear train having an externally toothed pinion, a multiple disc friction torque limiting device having alternately arranged pairs of relatively soft stationary, and relatively hard rotatable discs, normally spring pressed into non rotative frictional engagement, said soft discs being peripherally toothed to engage teeth on the inner surface of said housing and said hard discs having internal teeth to mate with the external teeth of said pinion, a relatively soft spacer disc arranged between each pair of hard discs, one disc of each pair of hard discs having a greater number of internal teeth than the other so as to be driven relatively to each other by said planetary gears so as to generate frictional heat and reduce the viscosity of lubricant and shear the same in the device adjacent said multiple disc assembly.

5. In combination with a planetary gear train mounted in a housing and arranged between a driving input shaft and a driven output shaft, said gear train having an externally toothed pinion, a multiple friction disc torque limiting device having alternately arranged pairs of stationary and rotatable discs normally spring pressed into frictional engagement, said stationary discs being peripherally toothed to engage teeth on the inner surface of said housing and said rotatable discs having internal teeth to mate with the external teeth of said pinion, one disc of each pair of rotatable discs having a greater number of internal teeth than the other so as to be rotated relatively to each other by said planetary gears.

References Cited in the file of this patent

UNITED STATES PATENTS

| Number | Name | Date |
| --- | --- | --- |
| 1,432,090 | Simpson | Oct. 17, 1922 |
| 2,271,640 | Heintz | Feb. 3, 1942 |
| 2,303,637 | Heintz | Dec. 1, 1942 |
| 2,419,253 | Cahill | Apr. 22, 1947 |
| 2,420,526 | Dixon | May 13, 1947 |
| 2,584,454 | Howard | Feb. 5, 1952 |